(12) United States Patent
Sarah et al.

(10) Patent No.: US 9,305,256 B2
(45) Date of Patent: Apr. 5, 2016

(54) AUTOMATED METHOD FOR MODIFYING NEURAL DYNAMICS

(71) Applicant: QUALCOMM Incorporated, San Diego, CA (US)

(72) Inventors: Anthony Sarah, San Diego, CA (US); Robert Howard Kimball, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 178 days.

(21) Appl. No.: 14/066,599

(22) Filed: Oct. 29, 2013

(65) Prior Publication Data

US 2015/0095273 A1  Apr. 2, 2015

Related U.S. Application Data

(60) Provisional application No. 61/885,950, filed on Oct. 2, 2013.

(51) Int. Cl.
*G06F 15/18* (2006.01)
*G06N 3/08* (2006.01)
*G06N 3/04* (2006.01)
*G06N 3/063* (2006.01)
*G06N 99/00* (2010.01)

(52) U.S. Cl.
CPC *G06N 3/049* (2013.01); *G06N 3/04* (2013.01); *G06N 3/063* (2013.01); *G06N 3/08* (2013.01); *G06N 3/082* (2013.01); *G06N 99/005* (2013.01)

(58) Field of Classification Search
None
See application file for complete search history.

(56) References Cited

U.S. PATENT DOCUMENTS

| 8,346,712 | B2  | 1/2013 | Rizvi et al. |  |
|---|---|---|---|---|
| 8,473,439 | B2* | 6/2013 | Arthur et al. | 706/35 |
| 2012/0023051 | A1 | 1/2012 | Pishehvar et al. |  |
| 2012/0165900 | A1 | 6/2012 | Zhu et al. |  |
| 2013/0073501 | A1 | 3/2013 | Hunzinger et al. |  |
| 2013/0117209 | A1* | 5/2013 | Aparin | 706/25 |

OTHER PUBLICATIONS

Proc. of SoftComputing'96, Iizuka, Japan, ed. T. Yamakawa, G. Matsumoto, pp. 482-485. Categorization, prototype theory and neural dynamics. Wlodzisiew Duch Department of Computer Methods, Nicolauss Copernicus University, ul. Grudziadzka 5, 87-100 Toruń, Poland.*
Snnet 0.1.0 users guide Robert A McDougal Jun. 1, 2011.*
Broad Range of Neural Dynamics From a Time-Varying FitzHugh-Nagumo Model and its Spiking Threshold Estimation Rose T. Faghih, Student Member, IEEE, Ketan Savla, Munther A. Dahleh, Fellow, IEEE, and Emery N. Brown, Fellow, IEEE.*
Biologically Inspired Spiking Neurons: Piecewise Linear Models and Digital Implementation Hamid Soleimani, Arash Ahmadi, Member, IEEE, and Mohammad Bavandpour—2012.*

(Continued)

*Primary Examiner* — Kakali Chaki
*Assistant Examiner* — Ababacar Seck
(74) *Attorney, Agent, or Firm* — Seyfarth Shaw LLP

(57) ABSTRACT

A method for improving neural dynamics includes obtaining prototypical neuron dynamics. The method also includes modifying parameters of a neuron model so that the neuron model matches the prototypical neuron dynamics. The neuron dynamics comprise membrane voltages and/or spike timing.

8 Claims, 11 Drawing Sheets

(56) References Cited

OTHER PUBLICATIONS

Bichler O., et al., "Design exploration methodology for memristor-based spiking neuromorphic architectures with the Xnet event-driven simulator", Proceedings of the 2013 IEEE/ACM International Symposium on Nanoscale Architectures (NANOARCH '13), Jul. 15, 2013, pp. 7-12, XP032498584, DOI: 10.1109/NANOARCH.2013.6623029.

Geit WV., et al., "Automated neuron model optimization techniques: a review", Biological Cybernetics, vol. 99, No. 4-5, Nov. 15, 2008, pp. 241-251, XP019657882, DOI: 10.1007/S00422-008-0257-6.

International Search Report and Written Opinion—PCT/US2014/052131—ISA/EPO—Apr. 16, 2015.

Luz Y., et al., "The effect of STDP temporal structure on the learning of single excitatory and inhibitory synapses", Abstracts of the 10th annual meeting on Computational and Systems Neuroscience (CoSyNe '13), 1-61, Feb. 28, 2013, p. 79, XP055123311, Retrieved from the Internet: URL:http://www.cosyne.org/cosyne13/Cosyne2013_program_book.pdf [retrieved on Jun. 12, 2014].

Ponulak F., "Analysis of the ReSuMe learning process for spiking neural networks", International Journal of Applied Mathematics and Computer Science, vol. 18, No. 2, Jun. 16, 2008, pp. 117-127, XP055123321, DOI: 10.2478/v10006-008-0011-1.

Richert M., et al., "Self-tuning spike-timing dependent plasticity curves to simplify models and improve learning", BMC Neuroscience, vol. 14, No. Suppl 1, P189, Jul. 8, 2013, pp. 1-4, XP021154698, DOI: 10.1186/1471-2202-14-S1-P189.

Roclin D., et al., "Design study of efficient digital order-based STDP neuron implementations for extracting temporal features", Proceedings of the 2013 International Joint Conference on Neural Networks (IJCNN'13), Aug. 4, 2013, pp. 1-8, XP032542009, DOI: 10.1109/IJCNN.2013.6707071.

Soleimani, H., et al., "Biologically inspired spiking neurons: Piecewise linear models and digital implementation", IEEE Transactions on Circuits and Systems I: Regular Papers, vol. 59, No. 12, Aug. 14, 2012. pp. 2991-3004, XP011473718, DOI: 10.1109/TCSI.2012.2206463.

Brette R., et al., "Vectorised algorithms for spiking neural network simulation," Oct. 20, 2010, pp. 1-23.

* cited by examiner

AUTOMATED METHOD FOR MODIFYING NEURAL DYNAMICS

CROSS REFERENCE TO RELATED APPLICATION

This application claims the benefit of U.S. Provisional Patent Application No. 61/885,950 entitled "AUTOMATED METHOD FOR MODIFYING NEURAL DYNAMICS," filed on Oct. 2, 2013, the disclosure of which is expressly incorporated herein by reference in its entirety.

BACKGROUND

1. Field

Certain aspects of the present disclosure generally relate to neural system engineering and, more particularly, to systems and methods for modifying neural dynamics in a neural network model.

2. Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

Researchers of spiking neural networks spend considerable time understanding and designing mathematical models of spiking neurons. These mathematical models can be arbitrarily complex and require manual tuning to produce some desired behavior. A designer will typically describe the neuron with a set of equations and parameters for those equations. Then, the parameters will be manipulated to match some characteristics of an existing or prototypical neuron. For example, the neuron model may be designed to reproduce the membrane voltage with respect to time of a neuron known to exist in biology. The researcher then uses the voltage over time of a known prototypical neuron as a reference and attempts to duplicate those dynamics with his own model. When presented with the same input as the prototypical neuron, the model neuron is meant to produce an accurate approximation of the membrane voltage after extensive tuning.

SUMMARY

In one aspect of the present disclosure, a method for improving neural dynamics is disclosed. The method includes obtaining prototypical neuron dynamics. The method further includes modifying parameters of a neuron model so that the neuron model matches the prototypical neuron dynamics.

Another aspect of the present disclosure is directed to an apparatus including means for obtaining prototypical neuron dynamics. The apparatus further includes means for modifying parameters of a neuron model so that the neuron model matches the prototypical neuron dynamics.

In another aspect of the present disclosure, a computer program product for improving neural dynamics having a non-transitory computer-readable medium is disclosed. The computer readable medium has non-transitory program code recorded thereon which, when executed by the processor(s), causes the processor(s) to perform operations of obtaining prototypical neuron dynamics. The program code also causes the processor(s) to modify parameters of a neuron model so that the neuron model matches the prototypical neuron dynamics.

Another aspect discloses an apparatus for improving neural dynamics having a memory and at least one processor coupled to the memory. The processor(s) is configured to obtain prototypical neuron dynamics. The processor(s) is further configured to modify parameters of a neuron model so that the neuron model matches the prototypical neuron dynamics.

An automated method for optimizing neural dynamics is disclosed. The method utilizes a piecewise linear neuron model and automatically determines parameters which best match the behavior of a prototypical neuron. The process obtains a prototypical neural dynamics. An optimization metric is defined and used to quantify the difference between the membrane voltages of the piecewise linear model and the prototypical neuron. The optimal parameters are then determined based on the optimization metric.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
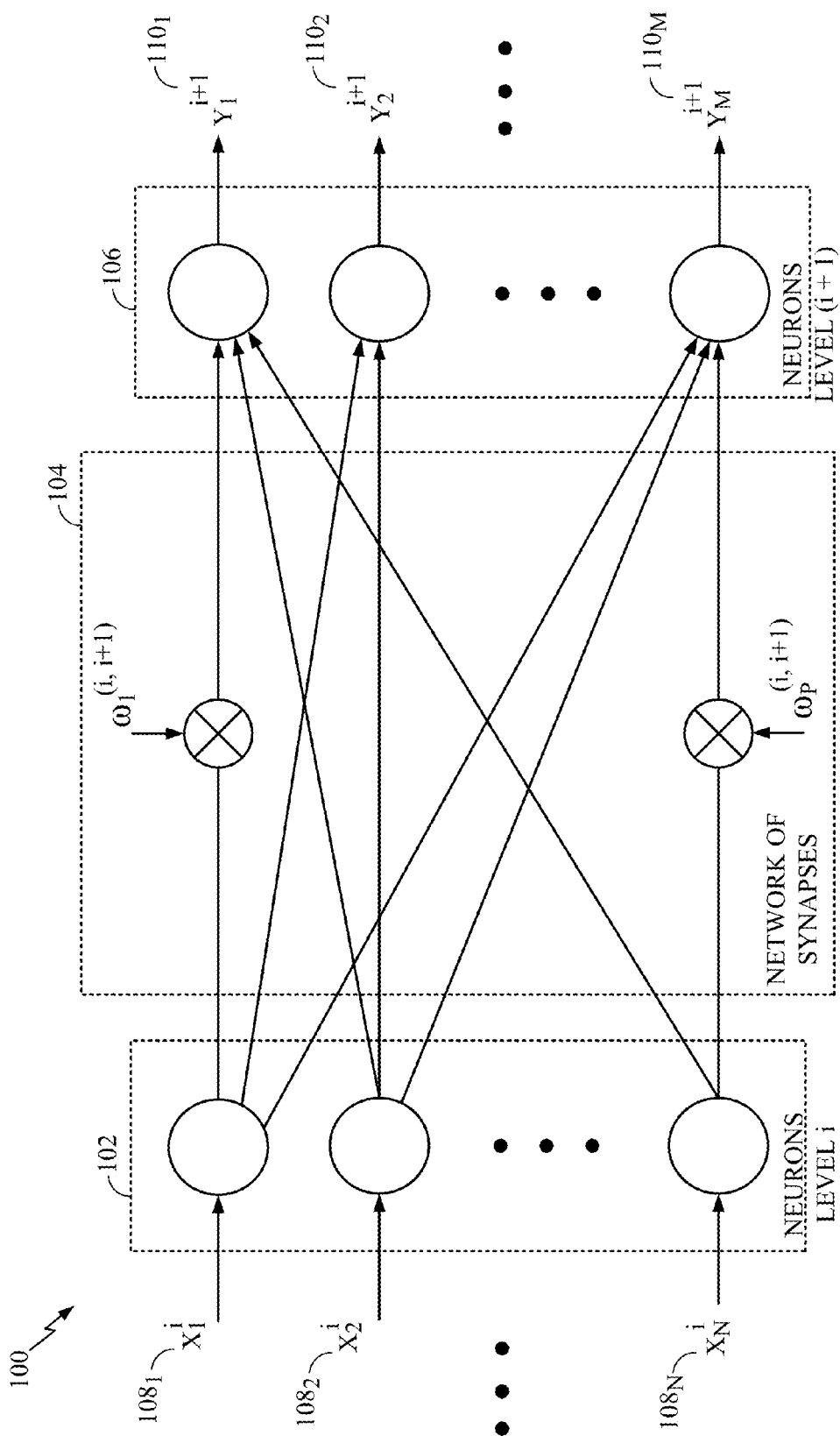
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (i.e., feed-forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered pre-synaptic neurons and neurons of level 106 may be considered post-synaptic neurons. The synapses 104 may receive output signals (i.e., spikes) from the level 102 neurons and scale those signals according to adjustable synaptic weights $w_1^{(i,i+1)}, \ldots, w_P^{(i,i+1)}$ where P is a total number of synaptic connections between the neurons of levels 102 and 106 and i is an indicator of the neuron level. For example, in the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals depolarize the membrane potential (i.e., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (i.e., lower) the membrane potential Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
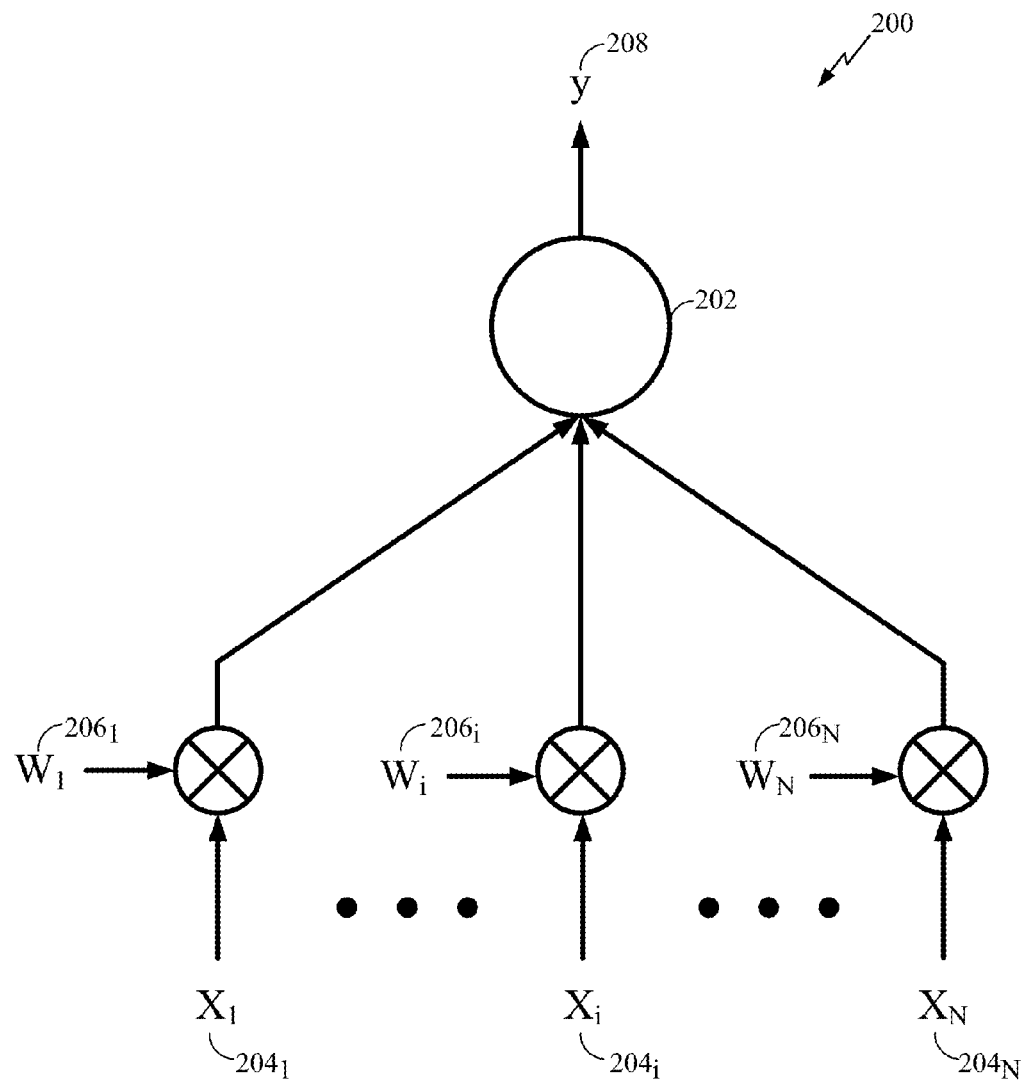
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($X_1$-$X_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, or a voltage, real-valued or complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may include non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not execute plasticity functions (or wait for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type. Use of varying synapse types may add flexibility and configurability to an artificial neural network.

There are implications of spike-timing dependent structural plasticity being executed independently of synaptic plasticity. Structural plasticity may be executed even if there is no change to weight magnitude (e.g., if the weight has reached a minimum or maximum value, or it is not changed due to some other reason) because structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to an insignificant level.

Because a neuron generally produces an output spike when many of its inputs occur within a brief period, (i.e., inputs being sufficiently cumulative to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by:

$$\Delta w(t) = \begin{cases} a_+ e^{-t/k_+} + \mu, & t > 0 \\ a_- e^{t/k_-}, & t < 0 \end{cases} \quad (1)$$

where $k_+$ and $k\_\tau_{sign(\Delta t)}$ are time constants for positive and negative time difference, respectively, $a_+$ and $a_-$ are corresponding scaling magnitudes, and $\mu$ is an offset that may be applied to the positive time difference and/or the negative time difference.

Figure 3:
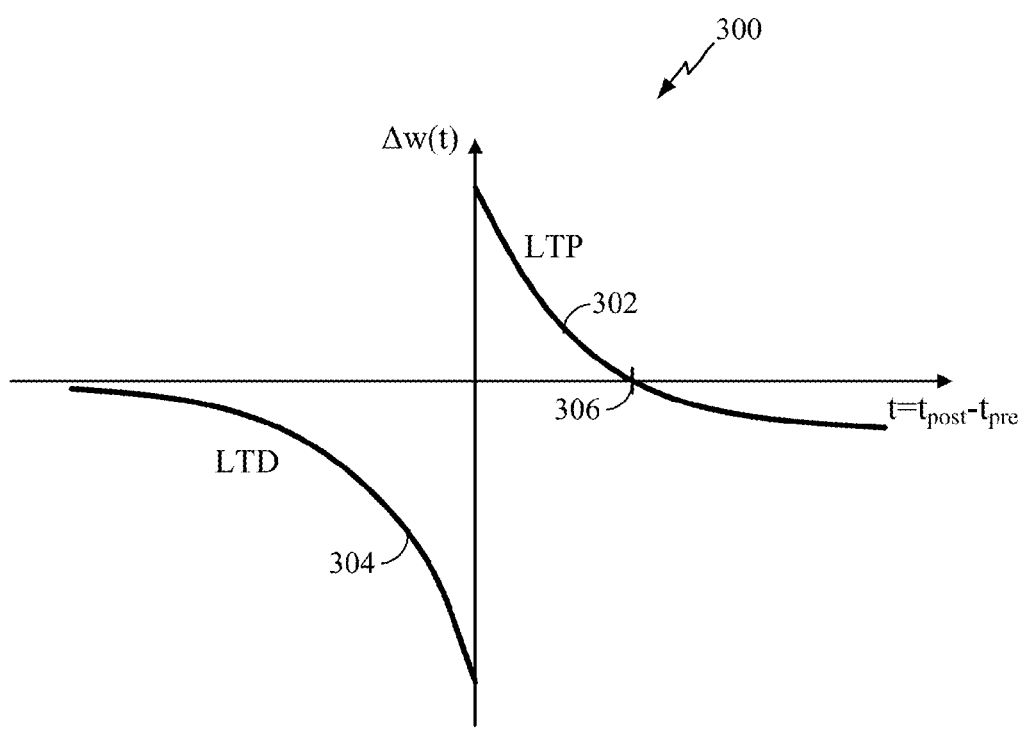
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of pre-synaptic and post-synaptic spikes in accordance with the STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input that is in the form of a frame of a particular duration of spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding. For example, the arrival time of inputs affects output time and coincidence detection can have a narrow time window. Additionally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
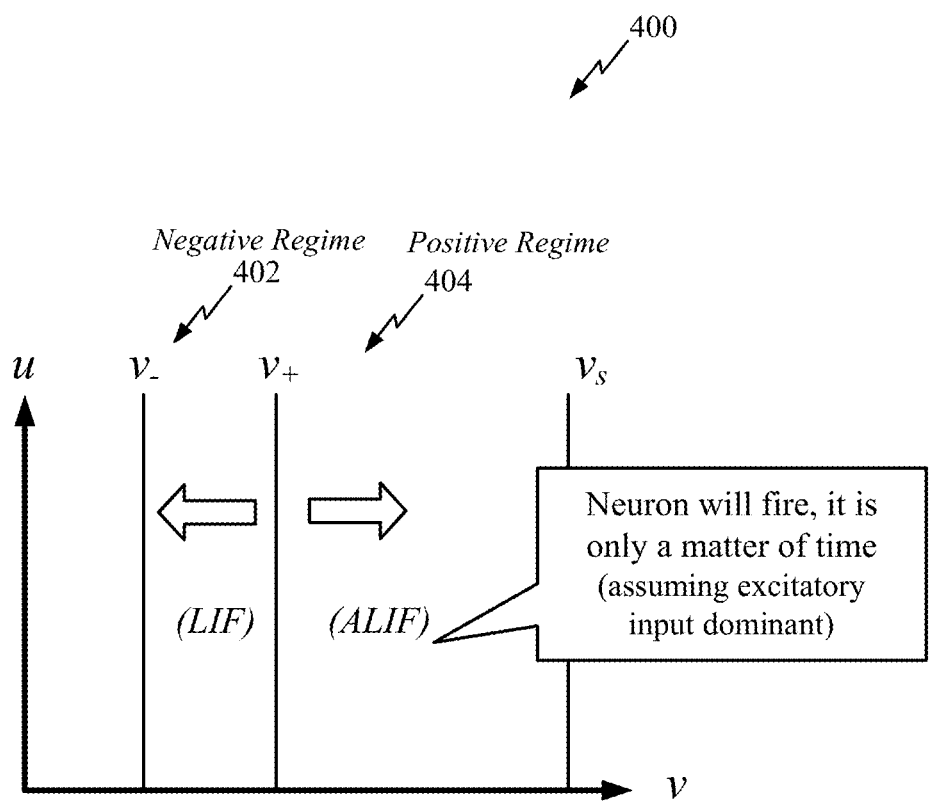
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime (which is different from the LIF neuron model)) and the positive regime 404 (also interchangeably referred to as the anti-leaky-integrate-and-fire (ALIF) regime, not to be confused with the ALIF neuron model)). In the negative regime 402, the state tends toward rest (v) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model may be defined to spike when the voltage v reaches a value $v_S$. Subsequently, the state may be reset at a reset event (which may be one and the same as the spike event):

$$v = \hat{v} \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are:

$$v(t + \Delta t) = (v(t) + q_\rho)e^{\frac{\Delta t}{\tau_\rho}} - q_\rho \tag{11}$$

$$u(t + \Delta t) = (u(t) + r)e^{-\frac{\Delta t}{\tau_u}} - r \tag{12}$$

Therefore, the model state may be updated only upon events, such as an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by:

$$\Delta t = \tau_\rho \log \frac{v_f + q_\rho}{v_0 + q_\rho} \tag{13}$$

If a spike is defined as occurring at the time the voltage state $v$ reaches $v_S$, then the closed-form solution for the amount of time, or relative delay, until a spike occurs as measured from the time that the voltage is at a given state $v$ is:

$$\Delta t_S = \begin{cases} \tau_+ \log \frac{v_S + q_+}{v + q_+} & \text{if } v > \hat{v}_+ \\ \infty & \text{otherwise} \end{cases} \tag{14}$$

where $\hat{v}_+$ is typically set to parameter $v_+$, although other variations may be possible.

The above definitions of the model dynamics depend on whether the model is in the positive or negative regime. As mentioned, the coupling and the regime $\rho$ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Modifying Neural Dynamics

Designing the equations to govern the dynamics of a prototypical neuron is a difficult task and requires high mathematical aptitude. A prototypical neuron is a neuron that is desired to be matched to another neuron. That is, in one configuration, a user may desire to match properties, such as spike timing and/or membrane voltages of a first neuron to a second neuron. In this configuration, the second neuron is the prototypical neuron. The prototypical neuron may also include all or some of the neurons in a neural network.

The manual tuning of the associated parameters for matching a neuron to a prototypical neuron is tedious and may utilize in-depth knowledge of the governing equations. That is, even if a neuron is provided with a set of equations, a researcher attempting to manually tune the parameters of those equations may also need to understand the equations that govern the prototypical neuron. Accordingly, the matching of a neuron to a prototypical neuron is time consuming and tedious because high degree of skill and/or knowledge may be needed to match a neuron to a prototypical neuron.

The proposed solution is to automate the process of equation design and the associated parameter tuning by using an underlying piecewise linear neuron model that determines the parameters which are substantially similar to the behavior of the prototypical neuron.

In one configuration, a piecewise linear neuron model is specified. The piecewise linear neuron model approximates the voltage-dependent function $g(v)$, i.e., $g(v)$ is equal to a constant over an interval $\Delta v$. That is, the piecewise linear neuron model provides a system of linear differential equations with constant coefficients. Once the problem is formulated as such, the differential equations may be solved either in continuous time or discrete time.

For the piecewise linear neuron model, the updates of the variables at each time step consist of six multiplies and four additions for complex input. The piecewise linear neuron model is flexible because $g(v)$ functions may be approximated, and therefore, most, if not all, models may be implemented with the same basic architecture for the updates of the variables. The coefficients used for the updates may change. Still, the coefficients may be easily pre-calculated and stored in memory. Moreover, the resolution $\Delta v$ with which we approximate the function $g(v)$ is a design parameter used to tradeoff accuracy and storage requirements.

Figure 5:
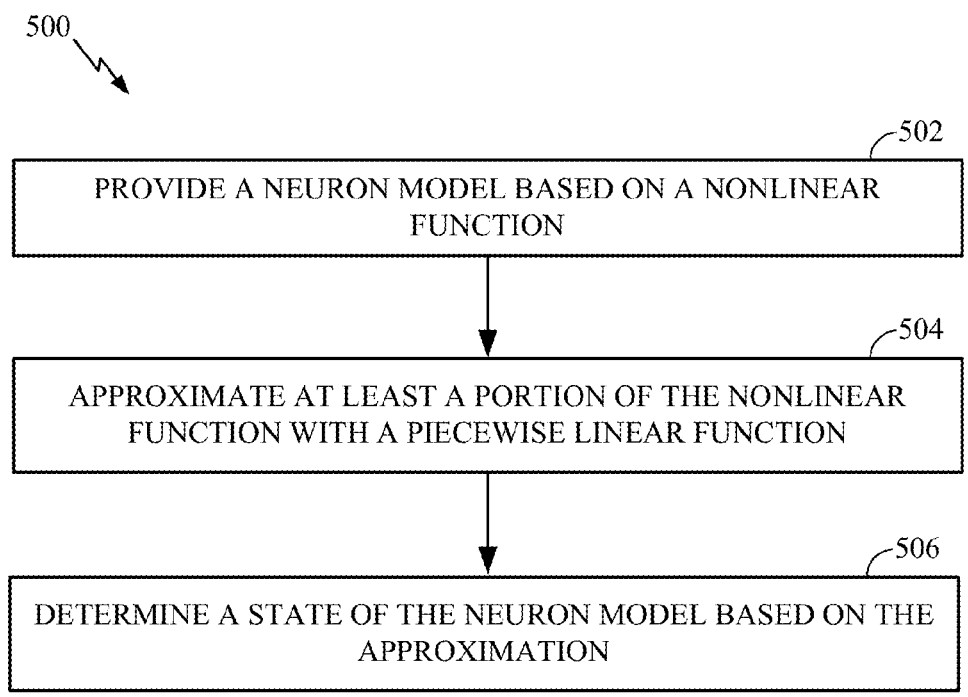
FIG. 5 is a flow diagram of example operations for approximating a portion of a nonlinear function of a neuron model as a piecewise linear function according to an aspect of the present disclosure.

FIG. 5 is a flow diagram of example operations 500 for neuron modeling using a piecewise linear approximation according to an aspect of the present disclosure. The operations 500 may be performed in hardware (e.g., by one or more processing units, such as a neuromorphic processor), in software, and/or in firmware.

The operations 500 may begin, at block 502, by providing a neuron model based on a nonlinear function. In one configuration, the nonlinear function includes a membrane potential (v) multiplied with a voltage-dependent conductance (g(v)). A portion of the nonlinear function may be the voltage-dependent conductance. In some cases, the neuron model may include an Izhikevich simple model, an exponential integrate and fire (EIF) model, a Fitzhugh-Nagumo model, a quartic model, and/or a continuous-time ordinary differential equations (ODE) latency-based dynamical (COLD) model. The neuron model may have at least two dimensions. In one configuration, the nonlinear function includes two or more different operating regimes. In another configuration, the neuron model includes one or more synaptic currents modeled with the nonlinear function.

At block 504, a portion of the nonlinear function may be approximated with a piecewise linear function. In one configuration, approximating the portion of the nonlinear function includes approximating a voltage-dependent function (F(v)) with the piecewise linear function. In this configuration, v is a membrane potential and a solution for the piecewise linear function includes a slope for each quantization interval (v(t)) and an intercept.

In one configuration, the approximation at block 504 includes obtaining predetermined coefficients for the piecewise linear function from a memory. In another configuration, the approximation at block 504 specifies determining a closed form solution for the neuron model linearized with the piecewise linear function.

At block 506, a state of the neuron model may be determined based on the approximation. In one configuration, the state is defined by a membrane potential (v) and a recovery current (u) of the neuron model. The piecewise linear function may be quantized based on intervals of the membrane potential (v). According to an aspect of the present disclosure, the piecewise linear function is constant over each of the intervals of the membrane potential (v). In one configuration, determining the state of the neuron model at 506 includes using an infinite impulse response (IIR) filter based on the approximation.

According to an aspect of the present disclosure, a step size (quantization interval) of the piecewise linear function is non-uniform. In one configuration, a step size of the piecewise linear function is dependent on the nonlinear function. In another configuration, a quantization in time of the neuron model is non-uniform. The quantization in time of the neuron model may be based on a type of neuron being modeled.

According to another aspect of the present disclosure, the operations 500 may further include determining another state of the neuron model based on the approximation and the state of the neuron model. The operations may further include outputting the state to a display for certain aspects.

The neural dynamics of the piecewise linear neuron model may be expressed in a state-space formulation $$\dot{x} = Ax + BI \quad (15)$$

$$y = v = Cx + v_r \quad (16)$$

$$x \triangleq \begin{bmatrix} v - v_r \\ u \end{bmatrix}, A = \begin{bmatrix} \frac{g(v)}{c} & -\frac{1}{c} \\ ab & -a \end{bmatrix}, B = \begin{bmatrix} \frac{1}{c} \\ 0 \end{bmatrix}, C = [1 \ 0] \quad (17)$$

In equations (1)-(3), I is the input current, v is the membrane voltage, u is the recovery variable and vr is the membrane rest voltage. The function g(v) defines certain characteristics of the neural behavior.

Equations (1)-(3) are state-space formulations of the piecewise linear neural dynamics. However, a discrete-time solution may also be specified to simulate and improve the neuron dynamics. In one configuration, a zero-order hold is assumed on the continuous-time equations. Thus, in the present configuration, the equations are:

$$x[n]=Gx[n-1]+HI[n-1] \quad (18)$$

$$y[n]=v[n]=Cx[n]+v_r \quad (19)$$

$$G=e^A \quad (20)$$

$$H=A^{-1}(G-I)B \quad (21)$$

Furthermore, in the present configuration, the discrete-time equations for the membrane voltage v and recovery variable u are $$v[n]=G_{11}v[n-1]+G_{12}u[n-1]+H_1I[n-1]+v_r \quad (22)$$

$$u[n]=G_{21}v[n-1]+G_{22}u[n-1]+H_2I[n-1] \quad (23)$$

From the equations above, the neuron parameters to be tuned are a, b, and. C. the parameters may be expressed in vector form as:

$$\theta=[abC]^T \quad (24)$$

In equation (9), θ may be referred to as the parameter vector.

Figure 6:
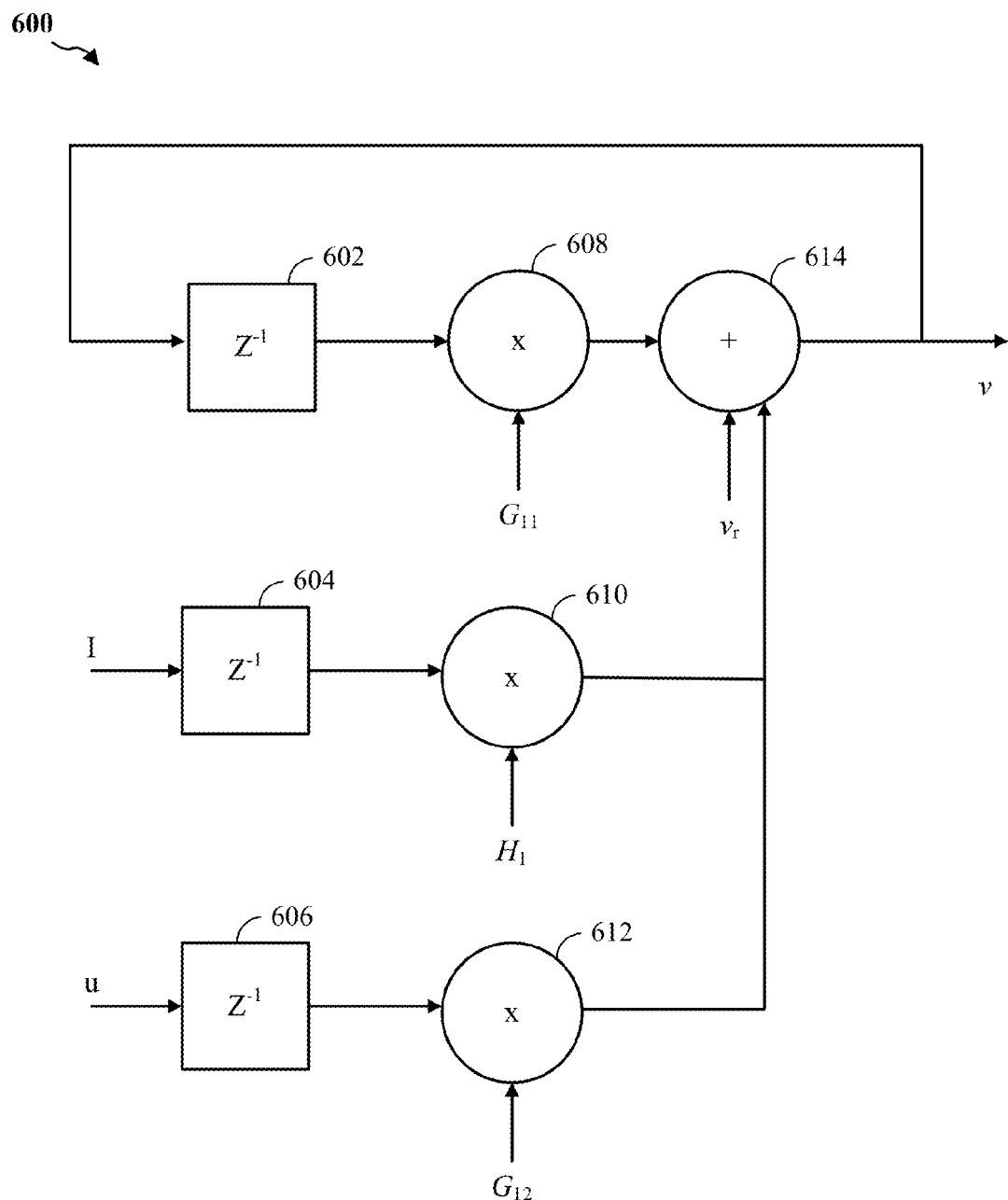
FIG. 6 illustrates an example of a diagram of piecewise linear functions governing neural dynamics according to an aspect of the present disclosure.

FIG. 6 illustrates a block diagram 600 of the piecewise linear functions governing neural dynamics that may be specified to determine a parameter value, such a v[n] and/or u[n]. The filter 600 may be based on equations (22) and (23). In one configuration, the filter 600 includes unit delays 602, 604, 606 to delay the input received at each delay. The unit delays 602, 604, 606, may be single processing delays with a delay of $z^{-1}$. A first unit delay 602 is specified to delay the previous value of v (i.e. (v−1)), the second unit delay 604 is specified to delay the value of I, and the third unit delay 606 is specified to delay the value of u.

The filter 600 may also include multipliers 608, 610, 612. A first multiplier 608 is specified to multiply the value of G11 with the delayed previous value of v. Additionally, a second multiplier 610 is specified to multiply the value of H1 with the delayed value of I. Moreover, a third multiplier is specified to multiply the value of G12 with the delayed value of u. The filter 600 also includes an adder 614 to add the output of the first multiplier 608, second multiplier 610, third multiplier 612, and a value vr. The output of the filter 600 is v. In this configuration, the filter is specified to determine the values of G11, H1, and G12.

To perform optimization of the parameters that are specified for the piecewise linear neuron model, a metric may be defined to quantify the fit to the prototypical neural dynamics. In one configuration, the metric is specified as the mean-squared error (MSE):

$$\Psi(\theta) = \frac{1}{N} \sum_{n=0}^{N-1} (v[n] - v_p[n])^2 \quad (25)$$

In equation (10), N is the total number of voltage samples, and vp is the membrane voltage of the prototypical neuron. In this configuration, the implicit dependence of v on θ is omitted for brevity. The metric (i.e., mean-squared error) quantifies the difference between the membrane voltages of the piecewise linear neuron and the prototypical neuron.

Given the optimization metric Ψ and parameter vector θ, multiple methods may be specified to find various parameters, for example, such as θ*. Specifically, θ* may be expressed as:

$$\theta^*=\mathrm{argmin}_\theta \Psi(\theta) \quad (26)$$

In one configuration, θ* may be determined using various algorithms, including but not limited to, genetic algorithms, pattern search, simulated annealing and simplex algorithms. However, because the discrete-time equations exist in closed-form and simple approximations to the matrix exponential (eA) exist, the improvements may be analytically performed.

To derive an analytical solution, the form of g(v) is defined. As an example, the form of g(v) is taken from the Izhikevich neuron:

$$g(v)=k(v-v_t) \quad (27)$$

In equation (12) $v_t$ is the membrane threshold voltage of the neuron and k is another free parameter of this prototypical model. In this case, the parameter vector θ becomes:

$$\theta=[abCk]^T. \quad (28)$$

In one configuration, θ* may be determined by computing the minimum of the improvement metric Ψ(θ) defined in equation (26). Mathematically, the minima of a continuous function may be determined when the gradient of that function is zero. In other words, the minimum of Ψ(θ) may be determined as follows:

$$\nabla_\theta \Psi(\theta) = 0 \qquad (29)$$

The gradient is determined by:

$$\nabla_\theta \Psi(\theta) = \left[ \frac{\partial \Psi(\theta)}{\partial a} \quad \frac{\partial \Psi(\theta)}{\partial b} \quad \frac{\partial \Psi(\theta)}{\partial C} \quad \frac{\partial \Psi(\theta)}{\partial k} \right]^T \qquad (30)$$

$$= \frac{2}{N} \sum_{n=0}^{N-1} \left( (v[n] - v_m[n]) \left[ \frac{\partial v(n)}{\partial a} \quad \frac{\partial v(n)}{\partial b} \quad \frac{\partial v(n)}{\partial C} \quad \frac{\partial v(n)}{\partial k} \right]^T \right)$$

Accordingly, in one configuration, computing the gradient specifies determining the partial derivative of equation (22) with respect to each variable in the parameter vector θ. In one configuration, a forward rectangular rule approximation of the matrix exponential shown in equation (20) may be specified for computing the gradient. With this approximation, the equations for G and H are specified as"

$$G = e^A \approx A + I \qquad (31)$$

$$H = A^{-1}(G-I)B \approx B \qquad (32)$$

In equations (31) and (32), I is the identity matrix. The partial derivatives of equation (30) are:

$$\frac{\partial v(n)}{\partial a} = \frac{u[n-2] - bx_1[n-2]}{C} \qquad (33)$$

$$\frac{\partial v(n)}{\partial b} = -\frac{ax_1[n-2]}{C} \qquad (34)$$

$$\frac{\partial v(n)}{\partial C} = \frac{(abx_1[n-2] + (1-a)u[n-2] - k(v[n-1] - v_t)x_1[n-1] - I[n-1])}{(C^2)} \qquad (35)$$

$$\frac{\partial v(n)}{\partial k} = \frac{(v[n-1] - v_t)x_1[n-1]}{C} \qquad (36)$$

In equations (34)-(36), $x_1[n] = v[n] - v_r$ from equation (16). The gradient $\nabla_\theta \Psi(\theta)$ is used to iteratively update the value of the parameter vector θ:

$$\theta_{t+1} = \theta_t - \alpha \nabla_\theta \Psi(\Psi)|_{\theta = \theta_t} \qquad (37)$$

In equation (37), α is the update rate. The update of θt continues until convergence or when θt≈θ*.

In addition to the improvement metric defined in equation (24), other metrics may be used. In some cases, the modeling of the membrane voltage may not be important. Instead, the actual time at which the membrane voltage exceeds a threshold may be of importance. The membrane voltage exceeding a threshold may be referred to as a spike. In one configuration, the metric may be defined in terms of spike times. This metric may be defined as:

$$\Psi(\theta) = \frac{1}{\tau} \int_0^\infty (f(t; t, \tau) - f(t; t_p, \tau))^2 \, dt \qquad (38)$$

In equation (38), t is the vector of spike times for the piecewise linear neuron model and $t_p$ is the vector of spike times for the prototypical neuron. f(t;t,τ) may be defined as:

$$f(t; x, \tau) = \sum_{i=1}^N h(t - x_i) e^{\frac{t-x_i}{\tau}} \qquad (39)$$

In equation (39), N is the number of elements in x, h(·) is the Heaviside step function and τ is the time constant. The metric of equation (38) metric may be used to quantize spike time differences.

The aspects of the present disclosure are not limited to matching membrane voltage dynamics and/or spike times of two different neurons. In one configuration, the aspects of the present disclosure may also be used to design a fixed-point implementation of a floating-point model.

In some cases, the parameters for a piecewise linear neuron model may be determined using the aforementioned configurations. Moreover, in one example, the user may convert the piecewise linear neuron model to a fixed-point implementation. The conversion may be initiated by changing the parameters in θ and adding an extra term to the optimization metric. The parameter vector becomes:

$$\theta = [n_1 n_2 \ldots n_K]^T \qquad (40)$$

In equation (40) $n_1$ is the number of bits needed for variable 1, $n_2$ is the number of bits needed for variable 2 and so on. The metric formulated in equation (24) may include an additive term to become:

$$\Psi(\theta) = \frac{\beta}{N} \sum_{n=0}^{N-1} (v[n] - v_p[n])^2 + \frac{1-\beta}{K} \sum_{i=1}^K n_i \qquad (41)$$

In equation (41), β∈[0,1] controls the relative importance of the two terms.

Figure 7:
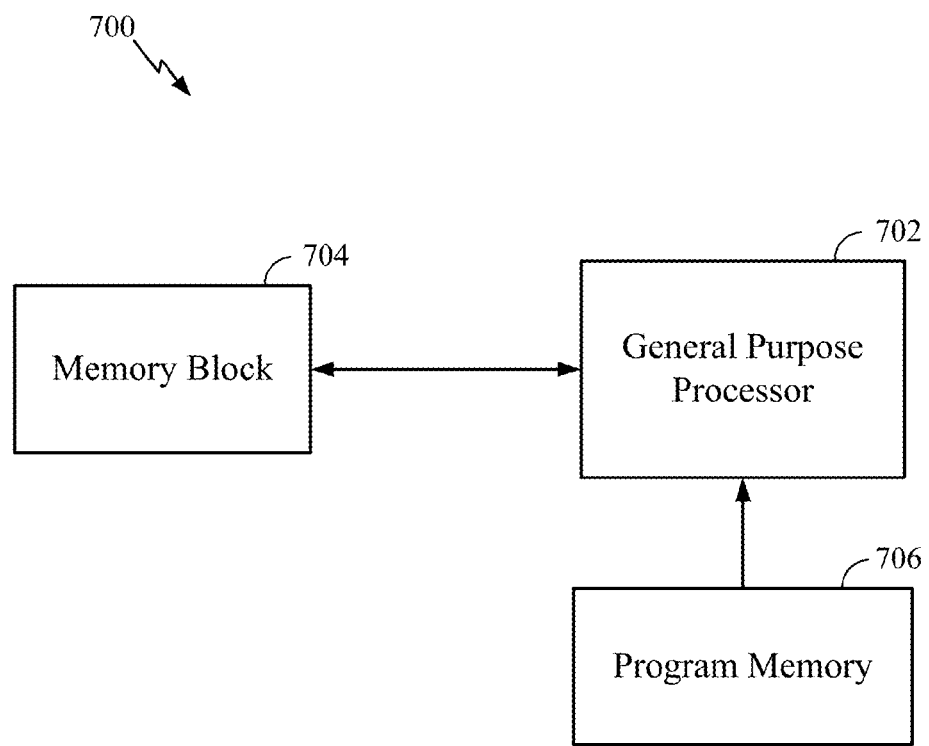
FIG. 7 illustrates an example implementation of designing a neural network using a general-purpose processor in accordance with certain aspects of the present disclosure.

FIG. 7 illustrates an example implementation 700 of the aforementioned modifying neural dynamics using a general-purpose processor 702 in accordance with certain aspects of the present disclosure. Variables (neural signals), synaptic weights, system parameters associated with a computational network (neural network), delays, and frequency bin information may be stored in a memory block 704, while instructions executed at the general-purpose processor 702 may be loaded from a program memory 706. In an aspect of the present disclosure, the instructions loaded into the general-purpose processor 702 may comprise code for obtaining prototypical neuron dynamics and/or modifying parameters of a neuron model so that the neuron model matches the prototypical neuron dynamics.

Figure 8:
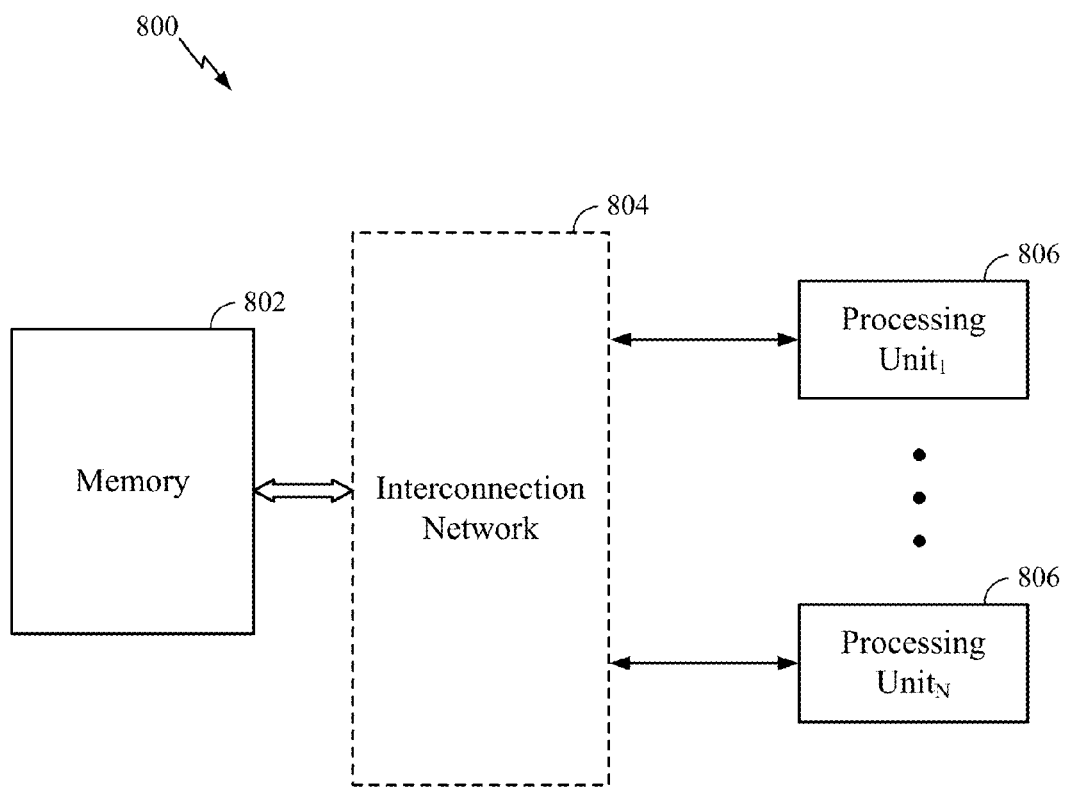
FIG. 8 illustrates an example implementation of designing a neural network where a memory may be interfaced with individual distributed processing units in accordance with certain aspects of the present disclosure.

FIG. 8 illustrates an example implementation 800 of the aforementioned modifying neural dynamics where a memory 802 can be interfaced via an interconnection network 804 with individual (distributed) processing units (neural processors) 806 of a computational network (neural network) in accordance with certain aspects of the present disclosure. Variables (neural signals), synaptic weights, system parameters associated with the computational network (neural network) delays, and/or frequency bin information may be stored in the memory 802, and may be loaded from the memory 802 via connection(s) of the interconnection network 804 into each processing unit (neural processor) 806. In an aspect of the present disclosure, the processing unit 806 may be configured to obtain prototypical neuron dynamics and/or modify parameters of a neuron model.

Figure 9:
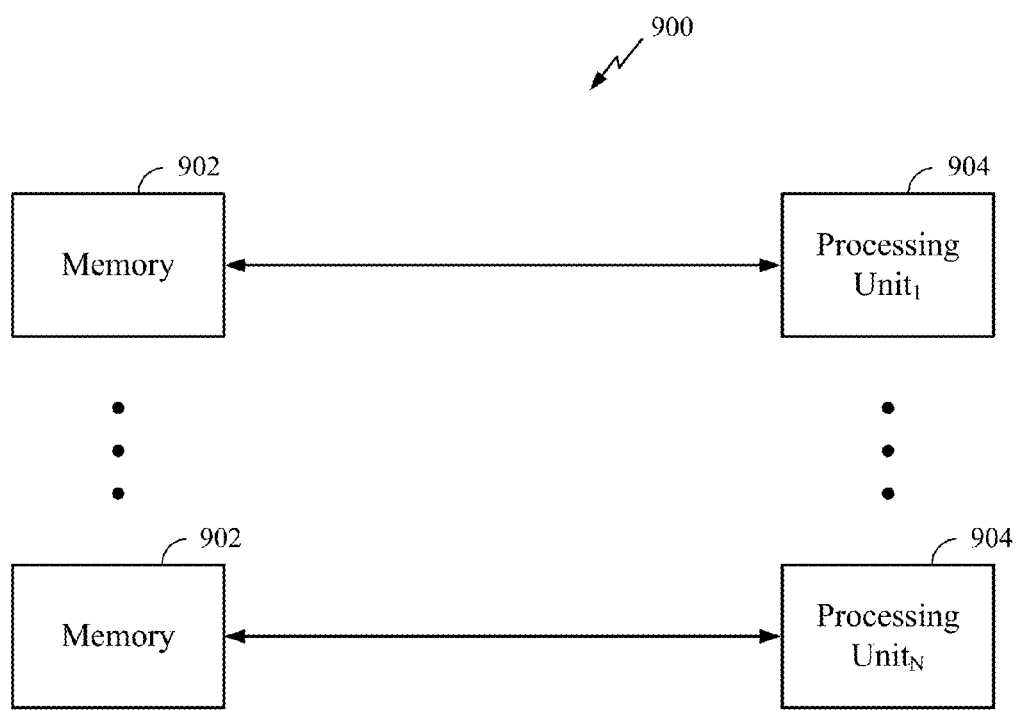
FIG. 9 illustrates an example implementation of designing a neural network based on distributed memories and distributed processing units in accordance with certain aspects of the present disclosure.

FIG. 9 illustrates an example implementation 900 of the aforementioned modifying neural dynamics. As illustrated in FIG. 9, one memory bank 902 may be directly interfaced with one processing unit 904 of a computational network (neural network). Each memory bank 902 may store variables (neural signals), synaptic weights, and/or system parameters associated with a corresponding processing unit (neural processor) 904 delays, and frequency bin information. In an aspect of the present disclosure, the processing unit 904 may be configured to obtain prototypical neuron dynamics and/or modify parameters of a neuron model.

Figure 10:
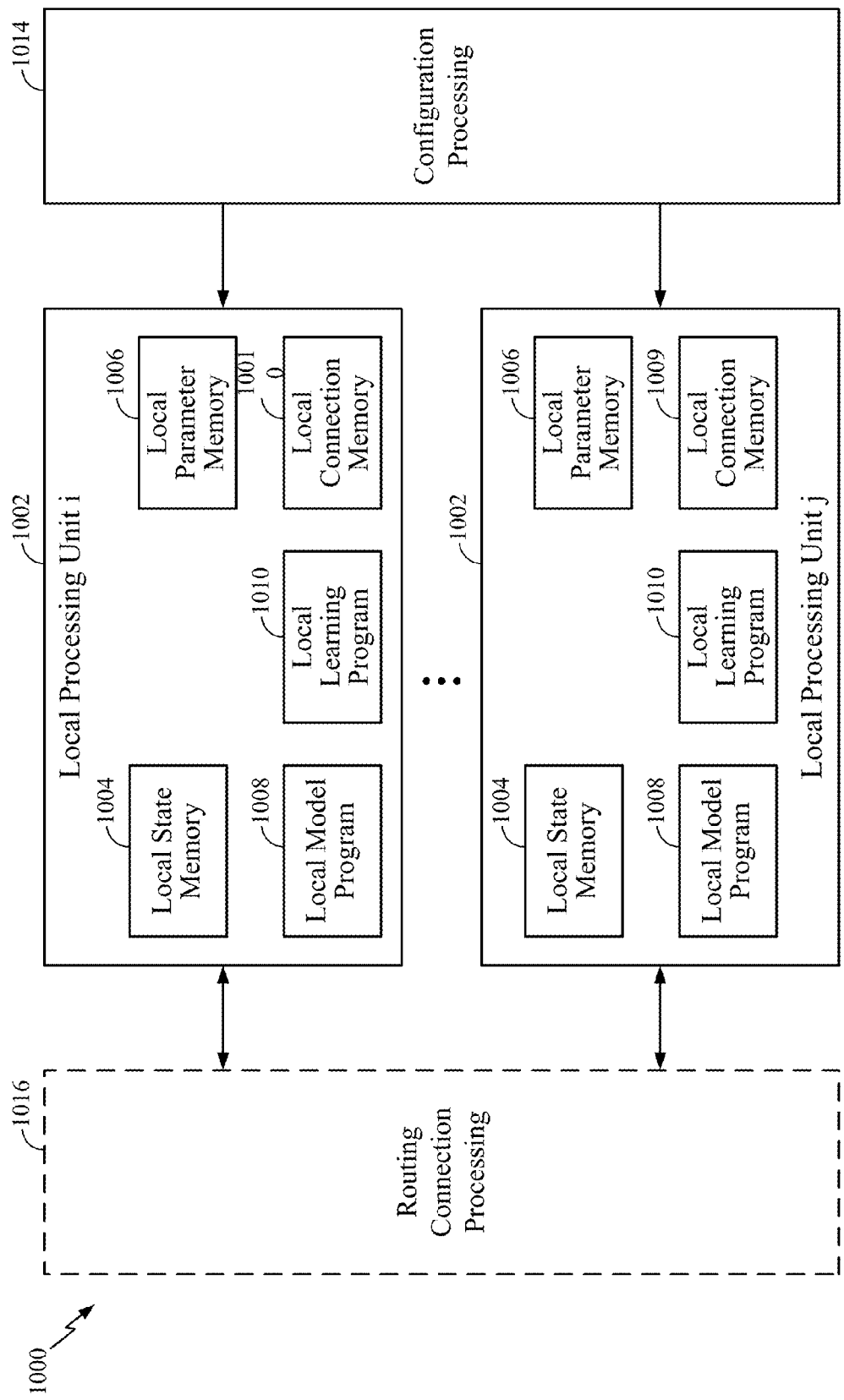
FIG. 10 illustrates an example implementation of a neural network in accordance with certain aspects of the present disclosure.

FIG. 10 illustrates an example implementation of a neural network 1000 in accordance with certain aspects of the present disclosure. As illustrated in FIG. 10, the neural network 1000 may have multiple local processing units 1002 that may perform various operations of methods described above. Each local processing unit 1002 may comprise a local state memory 1004 and a local parameter memory 1006 that store parameters of the neural network. In addition, the local processing unit 1002 may have a memory 1008 with local (neuron) model program, a memory 1010 with local learning program, and a local connection memory 1009. Furthermore, as illustrated in FIG. 10, each local processing unit 1002 may be interfaced with a unit 1014 for configuration processing that may provide configuration for local memories of the local processing unit, and with routing connection processing elements 1016 that provide routing between the local processing units 1002.

In one configuration, a neuron model is configured for obtaining prototypical neuron dynamics and/or modifying parameters of a neuron model. In one aspect, the obtaining means and/or modifying means may be the general-purpose processor 702, program memory 706, memory block 704, memory 802, interconnection network 804, processing units 806, processing unit 904, local processing units 1002, and or the routing connection processing elements 1016 configured to perform the functions recited by the mapping and/or firing means. In another configuration, the aforementioned means may be any module or any apparatus configured to perform the functions recited by the aforementioned means.

According to certain aspects of the present disclosure, each local processing unit 1002 may be configured to determine parameters of the neural network based upon desired one or more functional features of the neural network, and develop the one or more functional features towards the desired functional features as the determined parameters are further adapted, tuned and updated.

Figure 11:
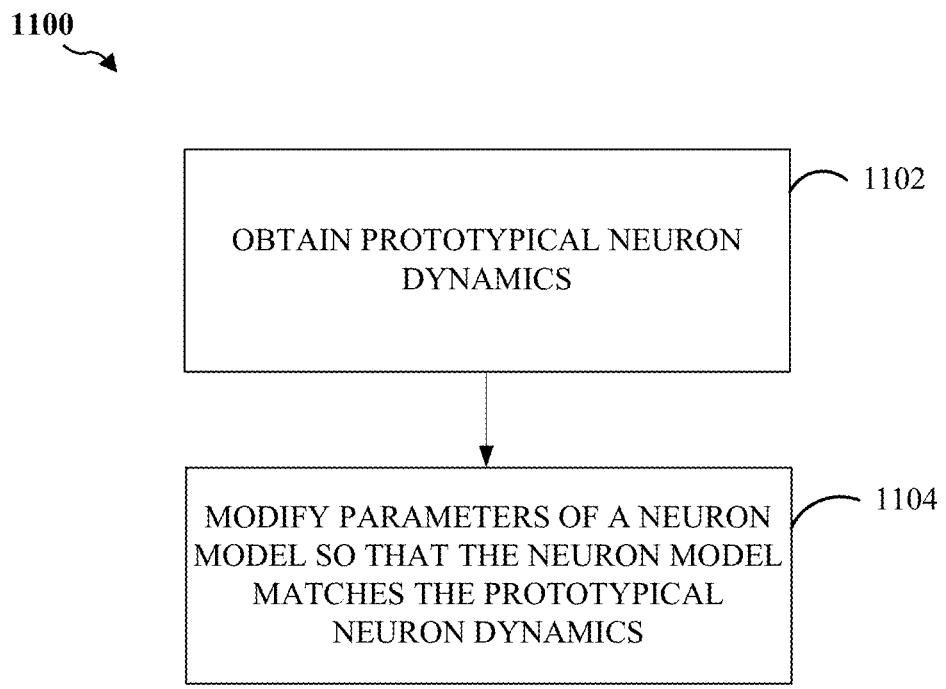
FIG. 11 is a block diagram illustrating a method for modifying neural dynamics according to an aspect of the present disclosure.

FIG. 11 illustrates a method 1100 for modifying neural dynamics. In block 1102 the neuron model obtains prototypical neuron dynamics. Furthermore, in block 1104, the neuron model modifies parameters of a neuron model so that the neuron model matches the prototypical neuron dynamics.

In one configuration, a neural network, such as the neural network of the aspects of the present disclosure, is configured to modify neural dynamics. The neural network may include means for obtaining and means for modifying. In one aspect, the obtaining means and/or modifying means may be the program memory 706, memory block 1004, memory 802, interconnection network 804, processing units 806, processing unit 904, local processing units 1002, and or the routing connection processing elements 1016 configured to perform the functions recited by the modifying and/or obtaining means In another configuration, the aforementioned means may be any module or any apparatus configured to perform the functions recited by the aforementioned means. That is, the various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the FIG. 11, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for improving neural dynamics of an artificial neural network stored in a device, comprising:
   obtaining prototypical neuron dynamics from a prototypical neuron, the neuron dynamics comprising at least spike timing; and
   modifying parameters of a piecewise linear neuron model, of the artificial neural network, so that at least a spike timing of the piecewise linear neuron model matches at least a spike timing of the prototypical neuron, the parameters being modified based on an objective function that determines a metric that quantizes a difference between a first function of spike times of the piecewise linear neuron model and a time constant and a second function of spike times of the prototypical neuron and the time constant.

2. The method of claim 1, in which the objective function minimizes a required number of bits in a representation of the piecewise linear neuron model.

3. The method of claim 1, in which the objective function reduces model complexity.

4. An artificial neural network, the artificial neural network comprising:
   a memory unit; and
   at least one processor coupled to the memory unit, the at least one processor being configured:
      to obtain prototypical neuron dynamics from a prototypical neuron, the neuron dynamics comprising at least spike timing; and
      to modify parameters of a piecewise linear neuron model, of the artificial neural network, so that at least a spike timing of the piecewise linear neuron model matches at least a spike timing of the prototypical neuron, the parameters being modified based on an objective function that determines a metric that quantizes a difference between a first function of spike times of the piecewise linear neuron model and a time constant and a second function of spike times of the prototypical neuron and the time constant.

5. The artificial neural network of claim 4, in which the objective function minimizes a required number of bits in a representation of the piecewise linear neuron model.

6. The artificial neural network of claim 4, in which the objective function reduces model complexity.

7. An apparatus for improving neural dynamics, comprising:
   means for obtaining prototypical neuron dynamics from a prototypical neuron, the neuron dynamics comprising at least spike timing; and
   means for modifying parameters of a piecewise linear neuron model, of the artificial neural network, so that at least a spike timing of the piecewise linear neuron model matches at least a spike timing of the prototypical neuron, the parameters being modified based on an objective function that determines a metric that quantizes a difference between a first function of spike times of the piecewise linear neuron model and a time constant and a second function of spike times of the prototypical neuron and the time constant.

8. A non-transitory computer-readable medium having program code recorded thereon, the program code comprising:
   program code to obtain prototypical neuron dynamics from a prototypical neuron stored in a memory unit, the neuron dynamics comprising at least spike timing; and
   program code to modify parameters of a piecewise linear neuron model, of the artificial neural network, so that at least a spike timing of the piecewise linear neuron model matches at least a spike timing of the prototypical neuron, the parameters being modified based on an objective function that determines a metric that quantizes a difference between a first function of spike times of the piecewise linear neuron model and a time constant and a second function of spike times of the prototypical neuron and the time constant.

* * * * *